(12) United States Patent
Meinburg et al.

(10) Patent No.: US 9,216,634 B1
(45) Date of Patent: Dec. 22, 2015

(54) ROCKER SEAL ATTACHMENT STRUCTURE

(71) Applicant: TOYODA GOSEI CO., LTD., Kiyosu-shi, Aichi-ken (JP)

(72) Inventors: George R. Meinburg, Davidson, MI (US); Douglas E. Pratt, Clarkston, MI (US); Derek Pauck, Shelby Township, MI (US)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/305,166

(22) Filed: Jun. 16, 2014

(51) Int. Cl.
*B60N 99/00* (2006.01)
*B60J 10/00* (2006.01)
*B60J 10/08* (2006.01)

(52) U.S. Cl.
CPC ............ *B60J 10/008* (2013.01); *B60J 10/0017* (2013.01); *B60J 10/0031* (2013.01); *B60J 10/085* (2013.01)

(58) Field of Classification Search
CPC .. B60J 10/008; B60J 10/0017; B60J 10/0031; B60J 10/085
See application file for complete search history.

(56) References Cited

U.S. PATENT DOCUMENTS 8,313,135 B2 * 11/2012 Iida et al. ................... 296/146.9
2010/0164248 A1 * 7/2010 Stoll .......................... 296/146.7

FOREIGN PATENT DOCUMENTS

JP     2002-283847 A     10/2002

* cited by examiner

*Primary Examiner* — Lori L Lyjak
(74) *Attorney, Agent, or Firm* — Posz Law Group, PLC

(57) ABSTRACT

A rocker seal attachment structure for a side door includes an attachment base that projects inward from the lower end of a cutline seal. A receiving surface is formed along the lower surface of the attachment base. The rocker seal includes a first clip and a second clip attached to an elongated rocker seal body, which is hollow and has an open end. An upper surface of the end of the rocker seal body in the vicinity of a door hinge configures an attachment surface. The end is fastened to the attachment base from below by the first clip with the attachment surface held in contact with the receiving surface. The rocker seal body is fastened to the side door from below by the second clip at a position spaced from the first clip in the longitudinal direction of the rocker seal body.

5 Claims, 3 Drawing Sheets

US 9,216,634 B1

ROCKER SEAL ATTACHMENT STRUCTURE

BACKGROUND OF THE INVENTION

The present invention relates to a rocker seal attachment structure for attaching a rocker seal to the lower end of a door of a vehicle.

Some vehicles having a door supported with a door hinge to be selectively opened and closed include a cutline seal and a rocker seal, which are attached to an inside portion of the door to seal a space between the door and the body of the vehicle. The cutline seal is attached to an end of the door in the vicinity of the door hinge in a state extended in the vertical direction. The rocker seal has an elongated shape extending in the front-rear direction and is attached to the lower end of the door to seal a space between the door and the rocker panel of the body.

As described in Japanese Laid-Open Patent Publication No. 2002-283847, for example, a technique for attaching a rocker seal to a door may employ a flange that projects from the lower end of a door toward the interior of the vehicle. Projections each having an engagement piece are formed at several positions of the flange. An attachment boss portion projecting toward the interior of the vehicle is formed between each adjacent pair of the projections of the flange. An attachment piece having engagement slots and engagement holes is formed in an upper portion of the rocker seal. Each of the attachment boss portions is inserted into the corresponding engagement hole and each of the projections is engaged with the corresponding engagement slot. The engagement pieces are then engaged with the attachment piece to attach the rocker seal to the door.

However, in the rocker seal attachment structure described in Japanese Laid-Open Patent Publication No. 2002-283847, the rocker seal is attached to the door from the lateral side by means of the attachment piece, which is formed in the upper portion of the rocker seal. As a result, when receiving external force produced by, for example, wind, the rocker seal may be deformed and flapped in the widthwise direction of the vehicle about the attachment piece as a fulcrum, thus causing variation in the sealing state between the door and the rocker panel by means of the rocker seal. The attachment structure thus needs to be improved to stabilize the sealing state.

SUMMARY OF THE INVENTION

Accordingly, it is an objective of the present invention to provide a rocker seal attachment structure capable of sealing a space between a door and a rocker panel in a stable state.

To achieve the foregoing objective, a rocker seal attachment structure is provided that is used for a door that is supported by a body of a vehicle with a door hinge to be selectively opened and closed. The door has a cutline seal extending in a vertical direction attached to an end of the door in the vicinity of the door hinge to seal a space between the door and the body, and the attachment structure attaches a rocker seal for sealing a space between the door and a rocker panel of the body to a lower end of the door. The attachment structure includes an attachment base projecting inward from a lower end of the cutline seal and a receiving surface formed along a lower surface of the attachment base. The rocker seal has an elongated rocker seal body, a first clip, and a second clip, wherein the first and second clips are attached to the rocker seal body. The rocker seal body is formed in a hollow shape through extrusion molding and has an open end. An upper surface of the end of the rocker seal body in the vicinity of the door hinge is configured as an attachment surface. The end is fastened to the attachment base from below by means of the first clip with the attachment surface held in contact with the receiving surface. The rocker seal body is fastened to the door from below by means of the second clip at a position of the rocker seal body spaced from the first clip in a longitudinal direction of the rocker seal body.

In the above-described configuration, to attach the rocker seal, the attachment surface, which is formed on the upper surface of the end of the rocker seal body in the vicinity of the door hinge, is held in contact with the receiving surface, which is arranged along the lower surface of the attachment base. In this state, the end of the rocker seal body in the vicinity of the door hinge is fastened to the attachment base from below using the first clip. Through such fastening, the end of the rocker seal body is attached to the door via the cutline seal. The rocker seal body is fastened to the door from below using the second clip at a position spaced from the first clip in the longitudinal direction of the rocker seal body.

Since the rocker seal is fastened to the door and the attachment base in the above-described manner, the rocker seal is unlikely to be deformed and the shape of the rocker seal is stabilized, compared with a case in which the rocker seal is fastened only to the door. This stabilizes the sealing state between the door and the rocker panel by the rocker seal.

DETAILED DESCRIPTION OF THE PREFERRED EMBODIMENTS

A rocker seal attachment structure according to one embodiment of the present invention will now be described with reference to the attached drawings.

In the description below, the advancing direction of the vehicle is referred to as the front and the reverse direction of the vehicle is referred to as the rear.

Figure 1:
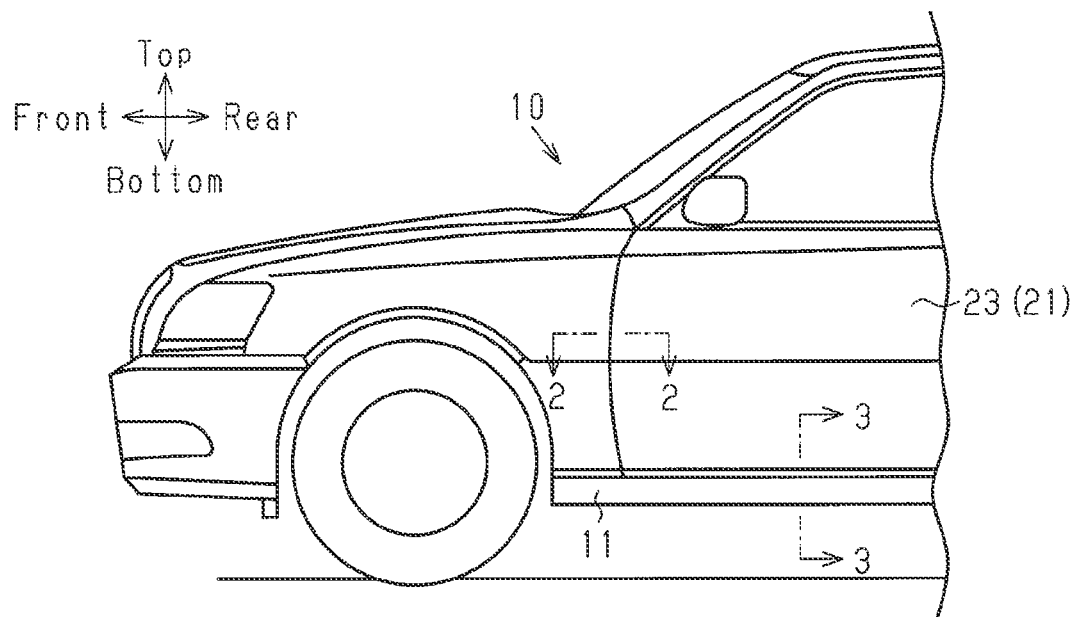
FIG. 1 is a side view showing a rocker seal attachment structure according to one embodiment of the present invention, illustrating a portion of a vehicle employing the attachment structure in a side door.
Figure 2:
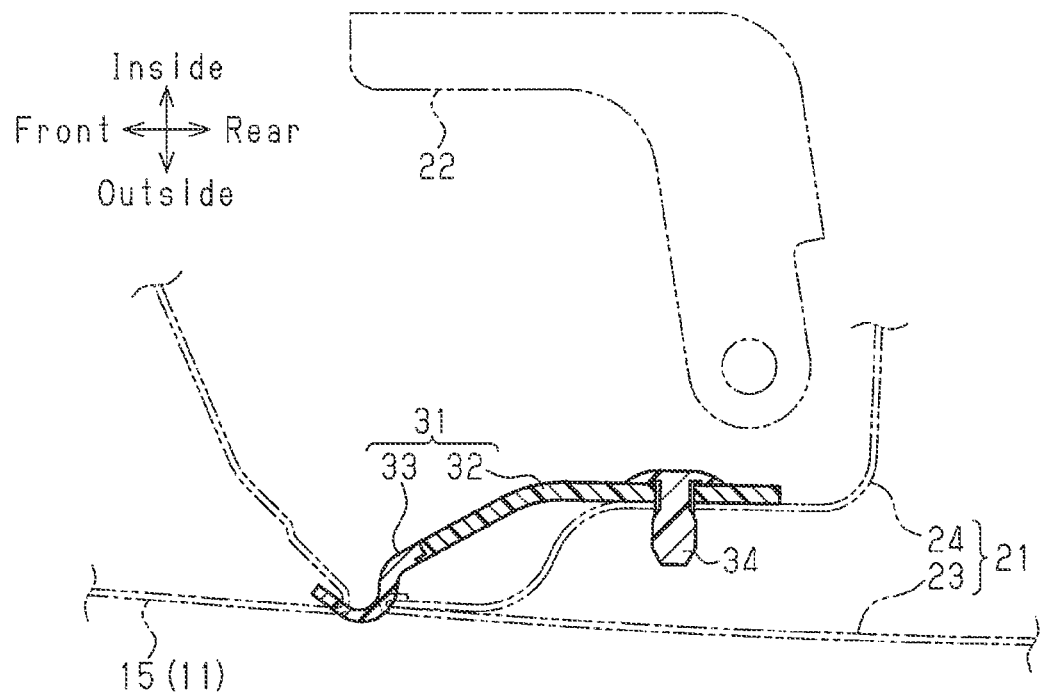
FIG. 2 is an enlarged cross-sectional view taken along line 2-2 of FIG. 1.
Figure 3:
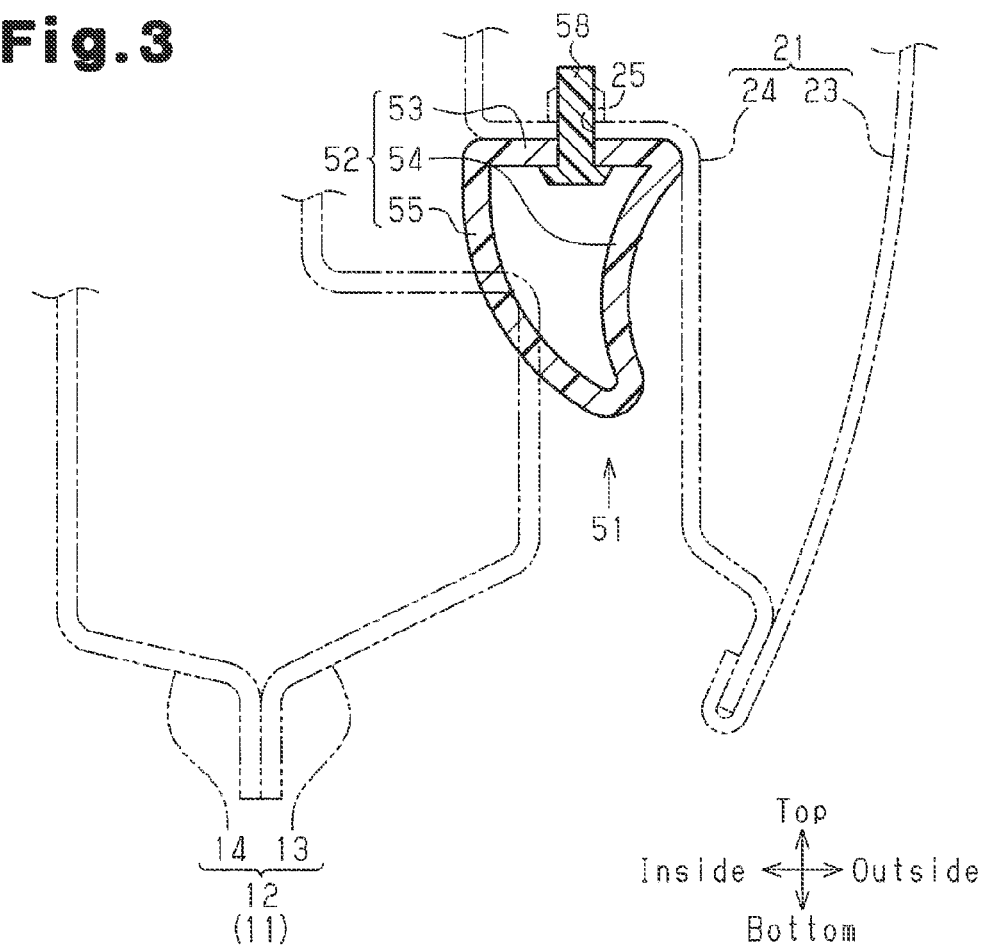
FIG. 3 is an enlarged cross-sectional view taken along line 3-3 of FIG. 1.

As illustrated in FIGS. 1 to 3, a side door 21 is provided at each side of a body 11 of an automobile 10 in the vehicle widthwise direction. Each of the side doors 21 is rotationally supported by the body 11 with a door hinge 22, which is located at the front end of the side door 21. The side door 21 is rotated to selectively open and close an opening (not illustrated) for boarding and exiting formed in the body 11.

Each side door 21 includes a door outer panel 23 and a door inner panel 24, which form an outer side portion and an inner side portion of the side door 21 in the vehicle widthwise direction, respectively. The door outer panel 23 and the door inner panel 24 are joined together at edges of the door outer and inner panels 23, 24 except for the upper portions. Through holes 25 are formed at several positions of the lower end of each door inner panel 24 in the front-rear direction.

With reference to FIG. 2, a cutline seal 31 extending in the vertical direction is attached to the front end of the door inner panel 24. The cutline seal 31 is employed to seal a space between a fender panel 15, which is a component of the body 11, and the door outer panel 23 and includes a base portion 32 and a seal lip 33. The base portion 32 is formed in a plate-like shape through injection molding using hard plastic such as polypropylene (PP). The seal lip 33 is formed using a softer plastic than the plastic forming the base portion 32, such as thermoplastic olefin (TPO). The seal lip 33 is formed integrally with the base portion 32 and extends outward and forward from the front end portion of the base portion 32. The seal lip 33 is formed in this shape through insert molding in which, for example, the base portion 32 is arranged in a mold as an insert and then TPO is introduced into the mold as molding material.

The cutline seal 31 is arranged such that the base portion 32 is overlapped with the door inner panel 24 from inside. The cutline seal 31 is fastened to the door inner panel 24 by means of clips 34, which are attached to several portions of the base portion 32 in the vertical direction. When the side door 21 is closed, the seal lip 33 contacts the fender panel 15 and is thus elastically deformed to eventually become pressed against the fender panel 15. This seals the space between the fender panel 15 and the door outer panel 23.

Referring to FIG. 3, a rocker panel 12 configures a portion of the body 11 facing the lower end portion of the side door 21 at the time when the side door 21 is closed. The rocker panel 12 includes a rocker outer panel portion 13 and a rocker inner panel portion 14, which configure the outer side portion and the inner side portion of the rocker panel 12 in the vehicle widthwise direction, respectively. The rocker outer panel portion 13 and the rocker inner panel portion 14 are joined together at upper edges and lower edges of the rocker outer and inner panel portions 13 and 14.

Figure 4:
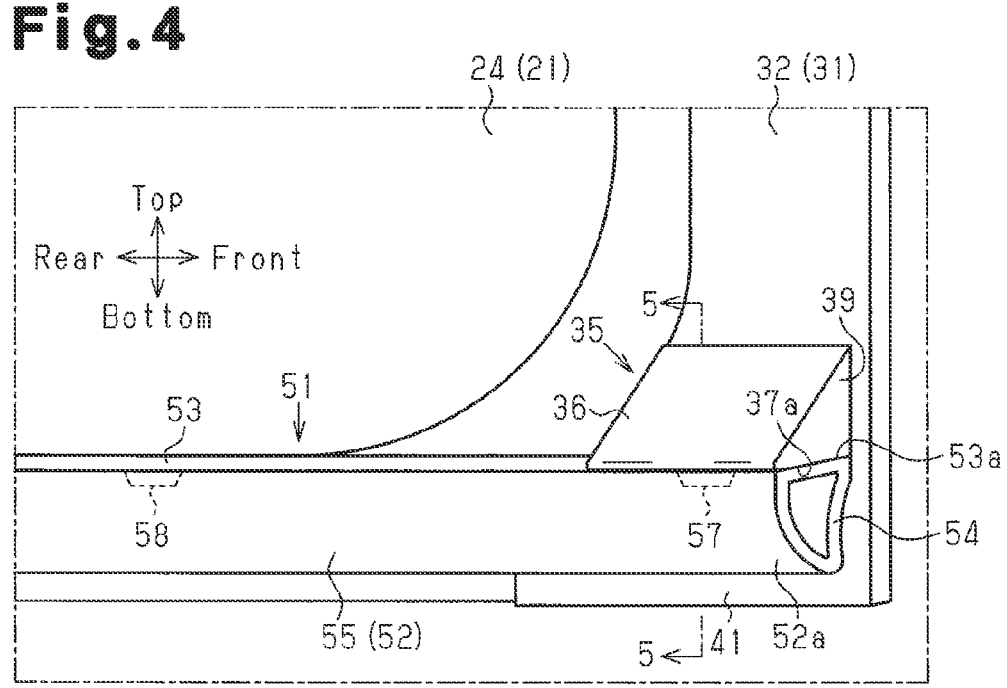
FIG. 4 is a perspective view showing a portion of the illustrated embodiment with a rocker seal attached to the lower end of the side door.
Figure 5:
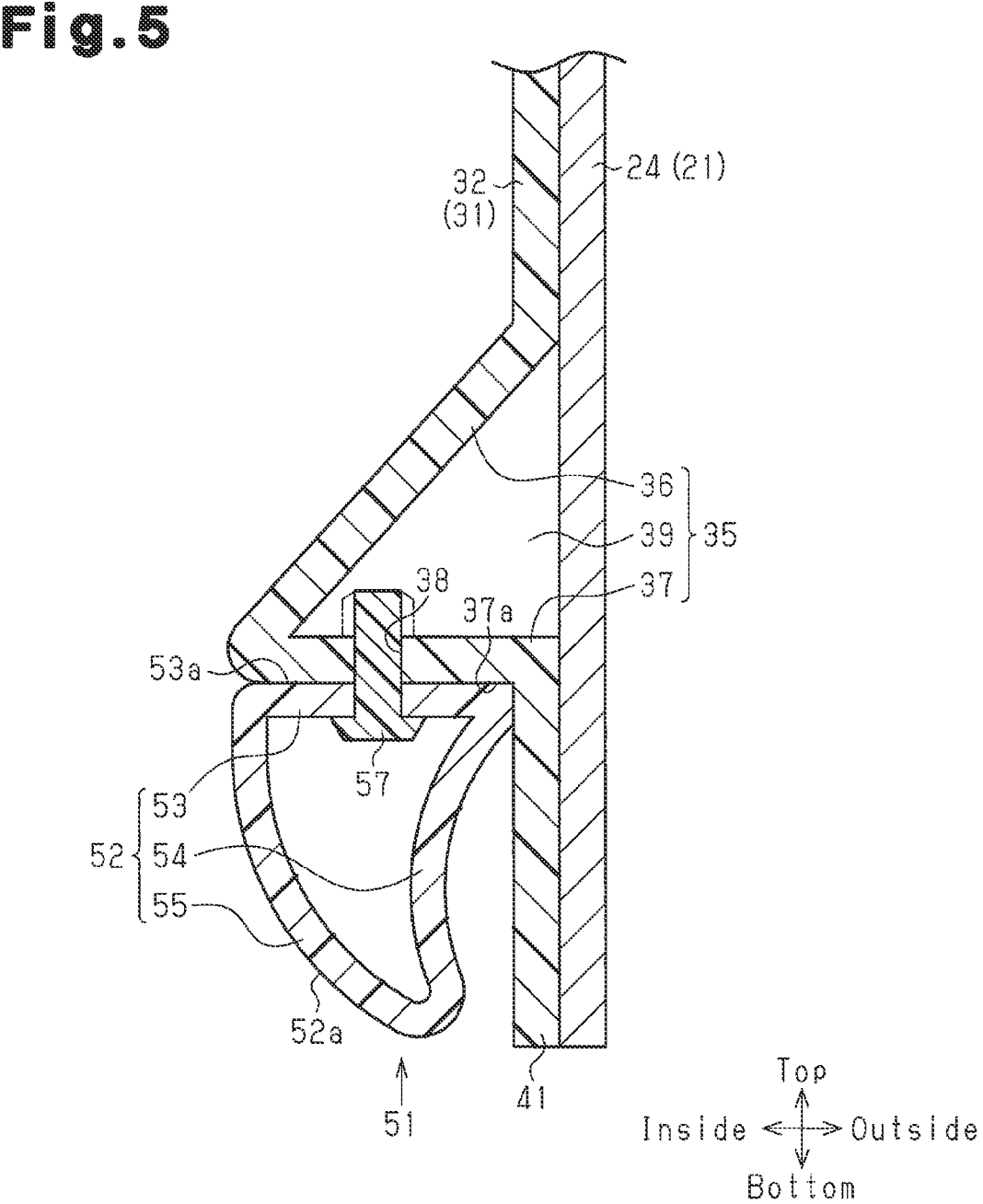
FIG. 5 is an enlarged cross-sectional view taken along line 5-5 of FIG. 4.

As illustrated in FIGS. 3 to 5, a rocker seal 51 is attached to the lower end portion of the door inner panel 24 to seal the space between the door inner panel 24 and the rocker outer panel portion 13 when the side door 21 is closed.

Specifically, an attachment base 35, which projects toward the interior of the vehicle, is formed integrally with the lower end of the base portion 32 of each cutline seal 31. The attachment base 35 includes a flat inclined wall portion 36, a flat bottom wall portion 37, and a pair of flat opposing wall portions 39. The inclined wall portion 36 is inclined such that the inclined wall portion 36 becomes more spaced inward from the base portion 32 in the downward direction. The bottom wall portion 37 extends outward from the lower end of the inclined wall portion 36. The opposing wall portions 39 block the space formed by the inclined wall portion 36 and the bottom wall portion 37 from the front and from behind. A lower surface of the bottom wall portion 37 is shaped flat to form a receiving surface 37a, to which the front end of a rocker seal body 52 is attached. The bottom wall portion 37 has a hole 38 extending through the bottom wall portion 37 in the vertical direction. A flat auxiliary wall portion 41 extends downward from an outer edge of the receiving surface 37a of the attachment base 35.

The rocker seal 51 includes the rocker seal body 52, which has an elongated shape, and a first clip 57 and second clips 58, which are attached to several positions of the rocker seal body 52. The rocker seal body 52 is formed by cutting a hollow extrudate, which is formed through extrusion molding, into sections by predetermined dimensions. The rocker seal body 52 includes an upper piece 53 and a pair of lateral pieces 54, 55. The upper piece 53 extends along the bottom wall portion 37 in the vehicle widthwise direction. The lateral pieces 54, 55 extend substantially downward from opposite lateral edges of the upper piece 53 in the vehicle widthwise direction and are joined together at the lower edges. The upper piece 53 and the lateral pieces 54, 55 shape the rocker seal body 52 such that the rocker seal body 52 has a substantially triangular cross section. A flat upper surface of the front end of the upper piece 53 configures an attachment surface 53a. Opposite longitudinal ends 52a of the rocker seal body 52 are used without machining including shaping and thus maintained in open states that have been brought about through the aforementioned cutting.

The first clip 57 is attached to and passed through the front end of the upper piece 53 upward from inside the rocker seal body 52. The second clips 58 are attached to and passed through the corresponding portions of the upper piece 53 of the rocker seal body 52 that are spaced rearward from the first clip 57. The second clips 58 project upward from inside the rocker seal body 52.

The first clip 57 is passed through the hole 38 from below in a state in which a substantially entire portion of the attachment surface 53a on the upper surface of the front end of the upper piece 53 is held in contact with the receiving surface 37a along the lower surface of the attachment base 35. In this state, the auxiliary wall portion 41 is located at the outer side of and in the vicinity of a front end of the lateral piece 54.

A portion of the upper piece 53 spaced rearward from the first clip 57 is held in contact with the door inner panel 24. In this state, the second clips 58 are passed through the through holes 25 from below.

Operation of the illustrated embodiment, which is configured as described above, will now be described.

The rocker seal 51 is attached to the side door 21 through (i) first fastening for fastening the front end of the upper piece 53 to the attachment base 35 and (ii) second fastening for fastening the upper piece 53 to the door inner panel 24.

To perform the first fastening, substantially the entire portion of the attachment surface 53a, which is formed flat on the front end of the upper piece 53, is held in surface contact with the receiving surface 37a, which is formed flat along the lower surface of the attachment base 35. In this state, the first clip 57 is passed through the hole 38 to fasten the front end of the upper piece 53 to the attachment base 35 from below. In this manner, the front end of the rocker seal body 52 is attached to the side door 21 via the cutline seal 31.

As has been described, the attachment surface 53a and the receiving surface 37a used for fastening by the first clip 57 are both flat and thus held in contact with each other each on a relatively large surface area. Also, the attachment base 35 is formed of the hard plastic and thus exhibits improved rigidity. As a result, even when receiving external force, the front end of the upper piece 53, which is fastened to the attachment base 35, is unlikely to be deformed.

At the second fastening, the upper piece 53 is held in contact with the door inner panel 24. In this state, the second clips 58 are passed through the though holes 25 to fasten the upper piece 53 to the door inner panel 24 from below. In this manner, the upper piece 53 is fastened to the door inner panel 24 in a state maintained in contact with the door inner panel 24, which has the improved rigidity. As a result, even when receiving external force, the upper piece 53 is unlikely to be deformed.

When the side door 21 is closed, the rocker seal body 52 contacts the rocker outer panel portion 13 at the lateral piece 55, which is the inner lateral piece, and is thus elastically deformed and pressed against the rocker outer panel portion 13. In this manner, the rocker seal body 52 seals the space between the side door 21 and the rocker panel 12.

The rocker seal 51 is fastened to the door inner panel 24 and the attachment base 35 in the above-described manner.

Accordingly, compared with a case in which the rocker seal 51 is fastened only to the door inner panel 24, the rocker seal 51 is less likely to be deformed and the shape of the rocker seal 51 is stabilized.

The rocker seal body 52 is configured by three pieces, which are the upper piece 53 and the two lateral pieces 54, 55, and has a triangular cross section. The shape of the rocker seal body 52 is thus stabilized with improved reliability.

The auxiliary wall portion 41 is arranged at the outer side of and in the vicinity of the outer lateral piece 54 of the rocker seal body 52. The auxiliary wall portion 41 is formed as a portion of the base portion 32 of the cutline seal 31 and thus has high rigidity. As a result, the auxiliary wall portion 41 contacts the outer lateral piece 54 when the front end of the lateral piece 54 is deformed outward, thus restricting further outward deformation of the lateral piece 54.

To attach the front end of the rocker seal body 52 to the side door 21, the front end of the rocker seal body 52 may be fastened to the attachment base 35 from the inner side. However, in this case, the rocker seal body 52 and the attachment base 35 are arranged adjacently in the vehicle widthwise direction, thus increasing the dimension of the fastening portion in the vehicle widthwise direction. In contrast, in the illustrated embodiment, the front end of the rocker seal body 52 is located below the attachment base 35 and fastened to the attachment base 35 from below. The dimension of the fastening portion using the first clip 57 in the vehicle widthwise dimension is thus determined by either the dimension of the attachment base 35 or the dimension of the rocker seal body 52 in the vehicle widthwise direction.

Alternatively, to seal the space between the side door 21 and the rocker panel 12 with the rocker seal body 52 in a stable state, a reinforcement member may be employed to improve the rigidity of the rocker seal 51. However, in this case, the reinforcement member would increase the number of components and raise cost.

In contrast, in the illustrated embodiment, the rocker seal 51 is fastened to the attachment base 35 from below to achieve the objective. The embodiment thus does not need to use a reinforcement member.

In the illustrated embodiment, the attachment base 35 must be added as an attachment portion for attaching the front end of the rocker seal 51. However, since the attachment base 35 is formed together with the base portion 32 of the cutline seal 31 when the base portion 32 is formed through injection molding, the attachment base 35 does not increase the number of components. Similarly, the auxiliary wall portion 41 does not increase the number of components, either.

In the illustrated embodiment, the rocker seal body 52 is formed by cutting a hollow extrudate formed through extrusion molding into sections by predetermined dimensions. The opposite open ends 52a of the rocker seal body 52 are used without having to be processed. That is, the ends 52a are not subjected to any type of machining for, for example, shaping afterwards. The machining cost for shaping the ends 52a is thus unnecessary.

The illustrated embodiment, which has been described in detail, has the advantages described below.

(1) The attachment base 35, which has the receiving surface 37a formed along the lower surface of the attachment base 35, projects from the lower end of the cutline seal 31 toward the interior of the vehicle. The rocker seal 51 is configured by attaching the first clip 57 and the second clips 58 to the elongated rocker seal body 52. The upper surface of the end (the front end) of the rocker seal body 52 in the vicinity of the door hinge 22 is employed as the attachment surface 53a. The attachment surface 53a is held in contact with the receiving surface 37a, and, in this state, the front end of the rocker seal body 52 is fastened to the attachment base 35 from below using the first clip 57. The portion of the rocker seal body 52 spaced rearward from the first clip 57 is then fastened to the door inner panel 24 from below using the second clips 58 (FIGS. 3 and 5).

The rocker seal body 52 is thus unlikely to be deformed and the shape of the rocker seal body 52 is stabilized. As a result, when receiving external force caused by, for example, wind, the rocker seal body 52 is unlikely to flap about the attachment portion as a fulcrum in the vehicle widthwise direction and thus cause variation in the sealing state between the side door 21 and the rocker panel 12 from one position to another. As a result, the sealing the space between the side door 21 and the rocker panel 12 is achieved in a stable state.

Since the front end of the rocker seal body 52 is fastened to the attachment base 35 from below, the dimension of the fastening portion in the vehicle widthwise direction is decreased. As a result, even when the gap between the side door 21 and the rocker panel 12 is relatively narrow, the sealing is achieved in a stable state to ensure the above-described advantage.

The front end of the rocker seal body 52 is fastened to the attachment base 35. This decreases the dimension of the gap between the cutline seal 31 and the rocker seal body 52, thus making it unlikely that rain water enters the gap.

The rocker seal 51 is attached to the side door 21 through simple operation, which is inserting the first clip 57 through the hole 38 of the attachment base 35 and passing the second clips 58 through the corresponding through holes 25 of the door inner panel 24.

(2) The attachment base 35 is formed integrally with the base portion 32 of the corresponding cutline seal 31 (FIGS. 4 and 5).

This configuration ensures the advantage (1) without employing a reinforcement member, thus preventing the number of components from being increasing. As a result, the cost for the components is decreased correspondingly.

(3) The receiving surface 37a and the attachment surface 53a are both shaped flat (FIG. 5).

The attachment surface 53a is thus held in contact with the receiving surface 37a by a relatively great surface area, and, in this state, the front end of the upper piece 53 is fastened to the attachment base 35 using the first clip 57. This stabilizes the shape of the front end of the upper piece 53 with improved reliability.

(4) An extrudate having a hollow shape is used to form the rocker seal body 52 and the ends 52a of the rocker seal body 52 are open (FIGS. 4 and 5).

As a result, unlike a case in which certain portions of the ends 52a are subjected to shaping, machining cost for such shaping is unnecessary in this configuration. This correspondingly saves the costs.

(5) The auxiliary wall portion 41 extends downward from the outer edge of each receiving surface 37a (FIGS. 4 and 5).

The auxiliary wall portion 41 thus restricts excessive outward deformation of the front end of the corresponding rocker seal body 52.

(6) The rocker seal body 52 is configured by the upper piece 53 having the attachment surface 53a and the two lateral pieces 54, 55, which extend substantially downward from the opposite lateral edges of the upper piece 53 in the vehicle widthwise direction and joined to each other at the lower edges. The rocker seal body 52 has a substantially triangular cross section (FIG. 5).

This configuration stabilizes the shape of the rocker seal body 52 with enhanced reliability and makes it unlikely that the rocker seal body 52 is crushed excessively.

The illustrated embodiment may be embodied in the modified forms described below.

The shape of the attachment base 35 may be modified in any other suitable manner as long as the receiving surface 37a is formed along the lower surface of the attachment base 35.

To fasten the front end of the rocker seal body 52 to the attachment base 35, either a single first clip 57 or a plurality of first clips 57 may be employed. If two or more first clips 57 are used, the first clips 57 may be aligned, for example, in the front-rear direction to fasten the front end of the rocker seal body 52 to the attachment base 35.

The attachment base 35 may be configured by a component separate from the base portion 32 of the corresponding cutline seal 31. One of the receiving surface 37a and the attachment surface 53a may be formed non-flat. The auxiliary wall portion 41 may be omitted from the cutline seal 31.

The modifications described above also ensure the advantage that the shape of the rocker seal 51 is stabilized to seal the space between the side door 21 and the rocker panel 12 in a stable state.

The rocker seal body 52 may have any suitable cross sectional shape other than the shape of the illustrated embodiment as long as the rocker seal body 52 is shaped hollow through extrusion molding.

The above-described rocker seal attachment structure may be used for a door having a door hinge provided at any suitable end other than the front end, which is, for example, a rear end. Also, the attachment structure may be employed for any suitable door other than the side door as long as the door is a hinged vehicle door.

The invention claimed is:

1. A rocker seal attachment structure used for a door that is supported by a body of a vehicle with a door hinge to be selectively opened and closed, wherein the door has a cutline seal extending in a vertical direction attached to an end of the door in the vicinity of the door hinge to seal a space between the door and the body, and the attachment structure attaches a rocker seal for sealing a space between the door and a rocker panel of the body to a lower end of the door, the attachment structure comprising:
an attachment base projecting inward from a lower end of the cutline seal; and
a receiving surface formed along a lower surface of the attachment base, wherein
the rocker seal has an elongated rocker seal body, a first clip, and a second clip, wherein the first and second clips are attached to the rocker seal body,
the rocker seal body is formed in a hollow shape through extrusion molding and has an open end,
an upper surface of the end of the rocker seal body in the vicinity of the door hinge is configured as an attachment surface,
the end is fastened to the attachment base from below by means of the first clip with the attachment surface held in contact with the receiving surface, and
the rocker seal body is fastened to the door from below by means of the second clip at a position of the rocker seal body spaced from the first clip in a longitudinal direction of the rocker seal body.

2. The rocker seal attachment structure according to claim 1, wherein the attachment base is formed integrally with the cutline seal.

3. The rocker seal attachment structure according to claim 1, wherein the receiving surface and the attachment surface are both shaped flat.

4. The rocker seal attachment structure according to claim 1, further comprising an auxiliary wall portion extending downward from an outer edge of the receiving surface.

5. The rocker seal attachment structure according to claim 1, wherein
the rocker seal body includes an upper piece having the attachment surface and a pair of lateral pieces extending downward from opposite lateral edges of the upper piece in the widthwise direction, and
the lateral pieces are joined together at lower edges thereof.

* * * * *